United States Patent [19]
Nakano et al.

[11] Patent Number: 5,899,827
[45] Date of Patent: May 4, 1999

[54] LOADING CAM FOR CONTINUOUSLY VARIABLE TOROIDAL TRANSMISSIONS

[75] Inventors: Masaki Nakano, Yokohama; Toshifumi Hibi, Kanagawa, both of Japan

[73] Assignee: Nissan Mvtor Co., Ltd., Yokohama, Japan

[21] Appl. No.: 08/844,761

[22] Filed: Apr. 22, 1997

[30] Foreign Application Priority Data

Apr. 26, 1996 [JP] Japan ................................ 8-107044

[51] Int. Cl.⁶ ................................ F16H 13/10
[52] U.S. Cl. ................ 476/41 R; 476/40; 476/8
[58] Field of Search .................... 476/40, 42, 10, 476/46, 48, 41, 2, 8

[56] References Cited

U.S. PATENT DOCUMENTS 5,027,668  7/1991  Nakano ................ 476/41 X
5,299,988  4/1994  Fukushima et al. ............ 476/42
5,372,555  12/1994  Hibi ........................... 476/42

FOREIGN PATENT DOCUMENTS 2-261950  10/1990  Japan .

Primary Examiner—Charles A. Marmor
Assistant Examiner—Marcus Charles
Attorney, Agent, or Firm—Foley & Lardner

[57] ABSTRACT

A loading cam for continuously variable transmissions includes cam rollers contacting an input disk and a cam flange to press the input disk in the axial direction of a main shaft of the transmission upon shifting, a holding member engaged with the cam flange to hold the cam rollers, and a cover attached to the holding member. The cover cooperates with the holding member to define a passage for supplying lubricating oil for the cam rollers.

12 Claims, 6 Drawing Sheets

LOADING CAM FOR CONTINUOUSLY VARIABLE TOROIDAL TRANSMISSIONS

BACKGROUND OF THE INVENTION

The present invention relates generally to a loading cam for continuously variable toroidal transmissions and more particularly, to a lubrication structure thereof.

A loading cam interposed between a cam flange and an input disk comprises cam rollers which contact the cam flange and the input disk, and a holding member for holding the cam rollers to restrict the positions thereof. The loading cam serves to press, upon shifting, the input disk to an output disk by relative rotation of the cam flange and the input disk so as to ensure frictional engagement with a power roller interposed between the two disks.

Generally, the loading cam is lubricated with oil supplied through holes formed at the base of the cam flange. When relative rotation of the cam flange and the input disk occurs, e.g. upon shifting, the cam rollers and the holes do not positionally correspond to each other, causing insufficient lubrication of the cam rollers, resulting in remarkably accelerated wear of the cam rollers and a cam surface, and possible seizure of the cam rollers.

In this connection, JP-A 2-261950 proposes a loading cam including a trough extending from the input disk to cover an end of a drive plate or cam flange or a trough connecting the drive plate and the input disk, and an oil reservoir formed inside the trough to hold lubricating oil for the cam rollers.

As for the above loading cam, engine torque transmitted to the input disk through the drive plate and the loading cam produces inevitable deformation of the input disk, which accompanies deformation of the trough. This requires an increase in space for the trough, resulting in enlarged size of the transmission, and results in possible detachment of the trough from the input disk.

It is, therefore, an object of the present invention to provide a loading cam for continuously variable toroidal transmissions which ensures lubrication of the cam rollers without any increase in size.

SUMMARY OF THE INVENTION

According to one aspect of the present invention, there is provided a loading cam for a continuously variable transmission provided with input and output disks disposed to face each other with respect to a main shaft of the transmission, a power roller frictionally engaged with the input and output disks, and a cam flange disposed at the back of the input disk, the loading cam comprising:

cam rollers contacting the input disk and the cam flange, said cam rollers pressing the input disk in an axial direction of the main shaft upon shifting;

a holding member engaged with the cam flange, said holding member holding said cam rollers; and a cover attached to said holding member, said cover cooperating with said holding member to define a passage for supplying lubricating oil for said cam rollers.

Another aspect of the present invention lies in providing, in a continuously variable transmission:

input and output disks disposed to face each other with respect to a main shaft of the transmission;

a power roller frictionally engaged with said input and output disks;

a cam flange disposed at a back of said input disk; and a loading cam comprising:

cam rollers contacting said input disk and said cam flange, said cam rollers pressing said input disk in an axial direction of said main shaft upon shifting;

a holding member engaged with said cam flange, said holding member holding said cam rollers; and a cover attached to said holding member, said cover cooperating with said holding member to define a passage for supplying lubricating oil for said cam rollers.

DETAILED DESCRIPTION OF THE INVENTION

Figure 1:
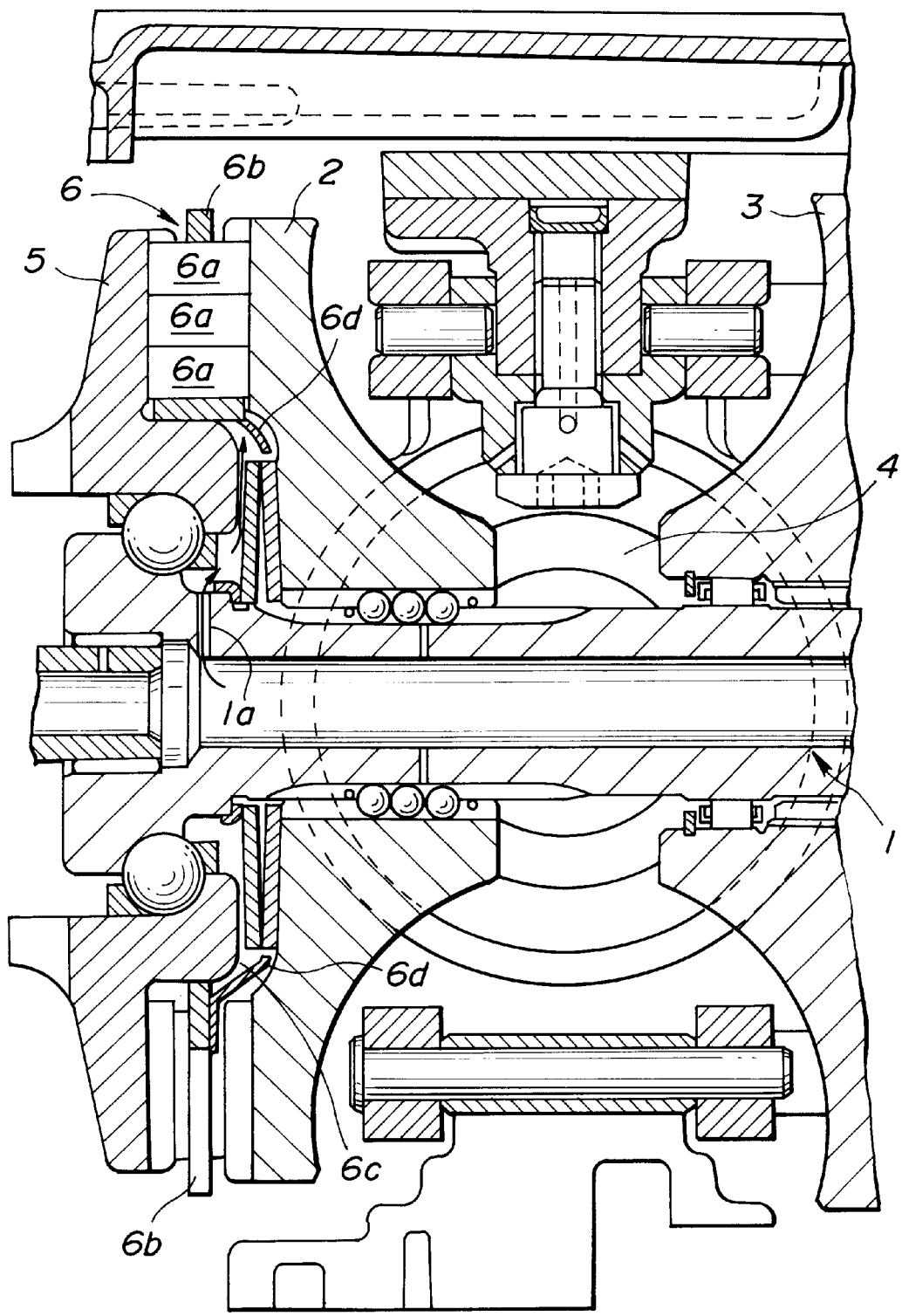
FIG. 1 is a fragmentary longitudinal section showing a continuously variable toroidal transmission to which the present invention is applied.

Referring first to FIG. 1, a continuously variable toroidal transmission comprises a main shaft 1, input and output disks 2, 3 disposed to face each other with respect to the main shaft 1, a power roller 4 frictionally engaged with the input and output disks 2, 3 for power transmission, a cam flange 5 disposed at the back of the input disk 2 and connected to a forward/reverse changeover unit and a torque converter, not shown, to receive engine torque, and a loading cam interposed between the input disk 2 and the cam flange 5. The loading cam 6 comprises cam rollers 6a contacting the input disk 2 and the cam flange 5 to press the input disk 2 in the axial direction of the main shaft 1 upon shifting, a holding member 6b engaged with the cam flange 5 to hold the cam rollers 6a and restrict the positions thereof, and a cover 6d attached to the holding member 6b to cooperate with a side surface of the holding member 6b so as to define an oil passage 6c for supplying lubricating oil for the cam rollers 6a.

Figure 2:
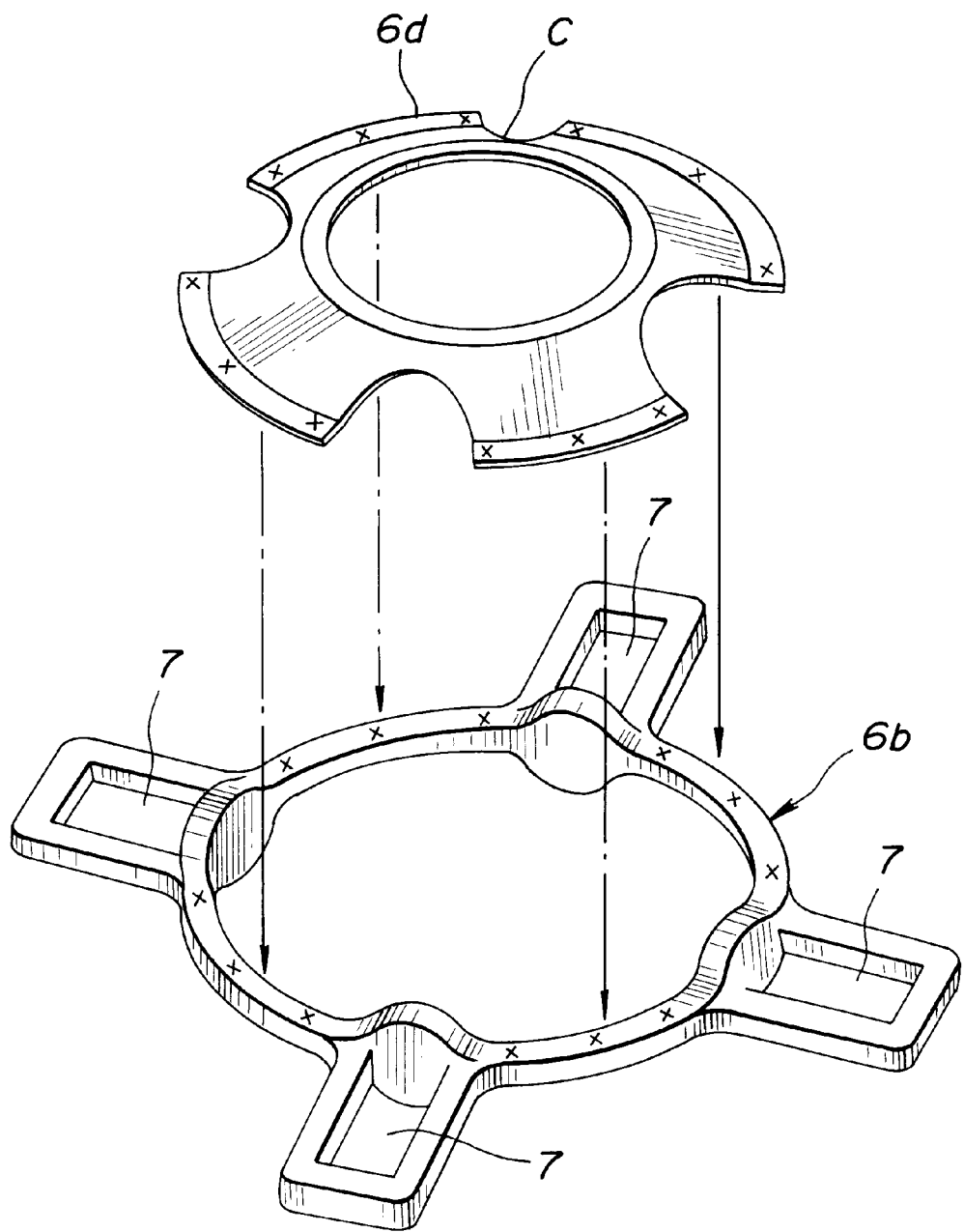
FIG. 2 is a perspective exploded view showing a first embodiment of a loading cam.

Referring to FIG. 2, in a first embodiment, the cover 6d having recesses C is joined to the holding member 6b by beam or spot welding which is only illustrated and not limitative. Since the cover 6d has the recesses C corresponding to positions 7 of the holding member 6b where the cam rollers 6a are disposed, lubricating oil flowing out of an oil hole 1a of the main shaft 1 as shown in FIG. 1 is held in the oil passage 6c, which flows therefrom to the cam rollers 6a through the recesses C.

Figure 3:
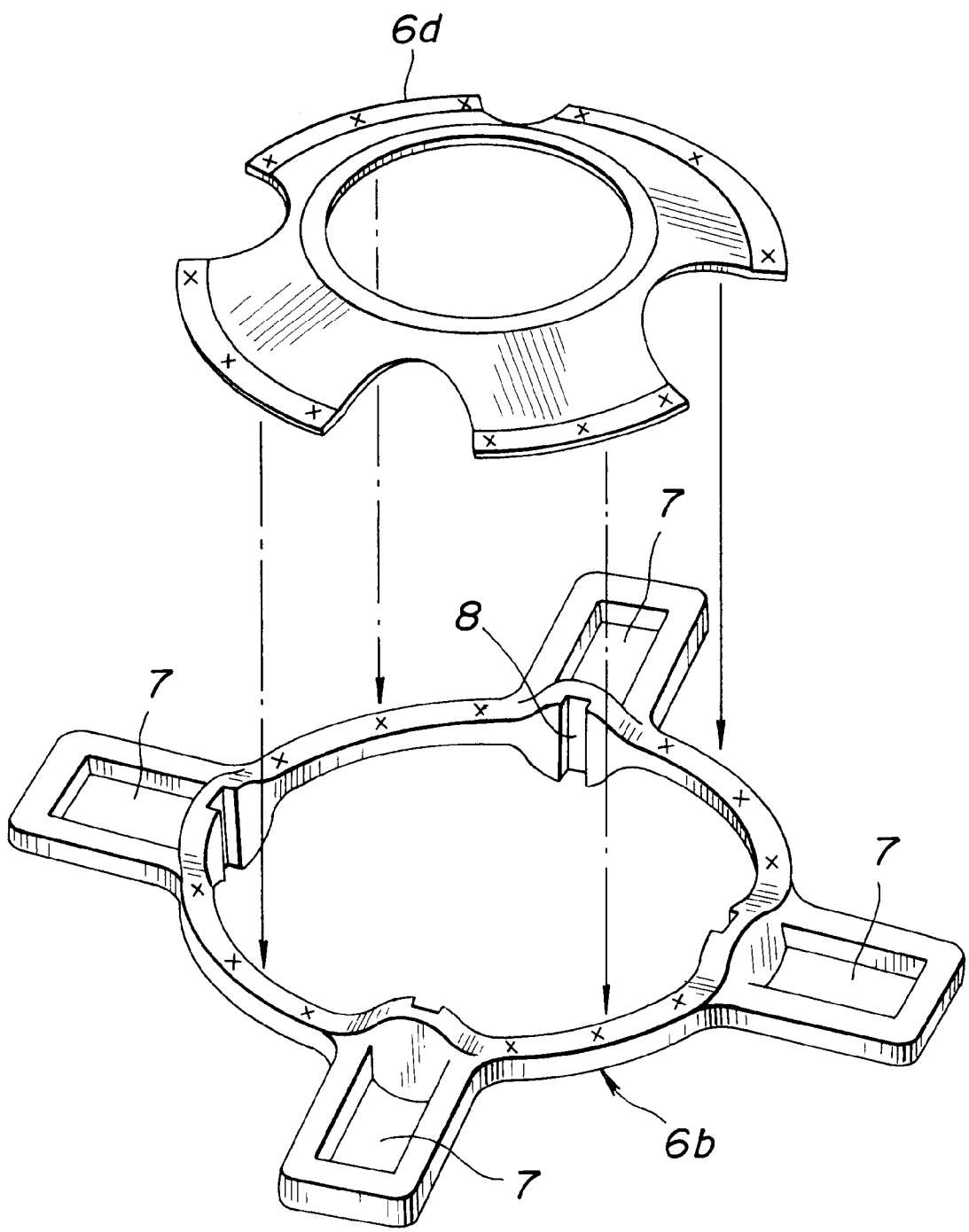
FIG. 3 is a view similar to FIG. 2, showing a second embodiment of the present invention.

FIG. 3 shows a second embodiment of the present invention wherein the holding member 6b has grooves 8 formed on the inner periphery contacting the cam flange 5 and below the positions 7 where the cam rollers 6a are disposed. Since the grooves 8 are formed in the axial direction of the main shaft 1, lubricating oil within the oil passage 6c flows through the grooves 8 not only to a front rolling surface of the cam rollers 6a, but to a rear rolling surface thereof, resulting in more effective lubrication of the cam rollers 6a. It is noted that the grooves 8 may be formed on the outer periphery of the holding member 6b to correspond to the positions 7 where the cam rollers 6a are disposed.

Figure 4:
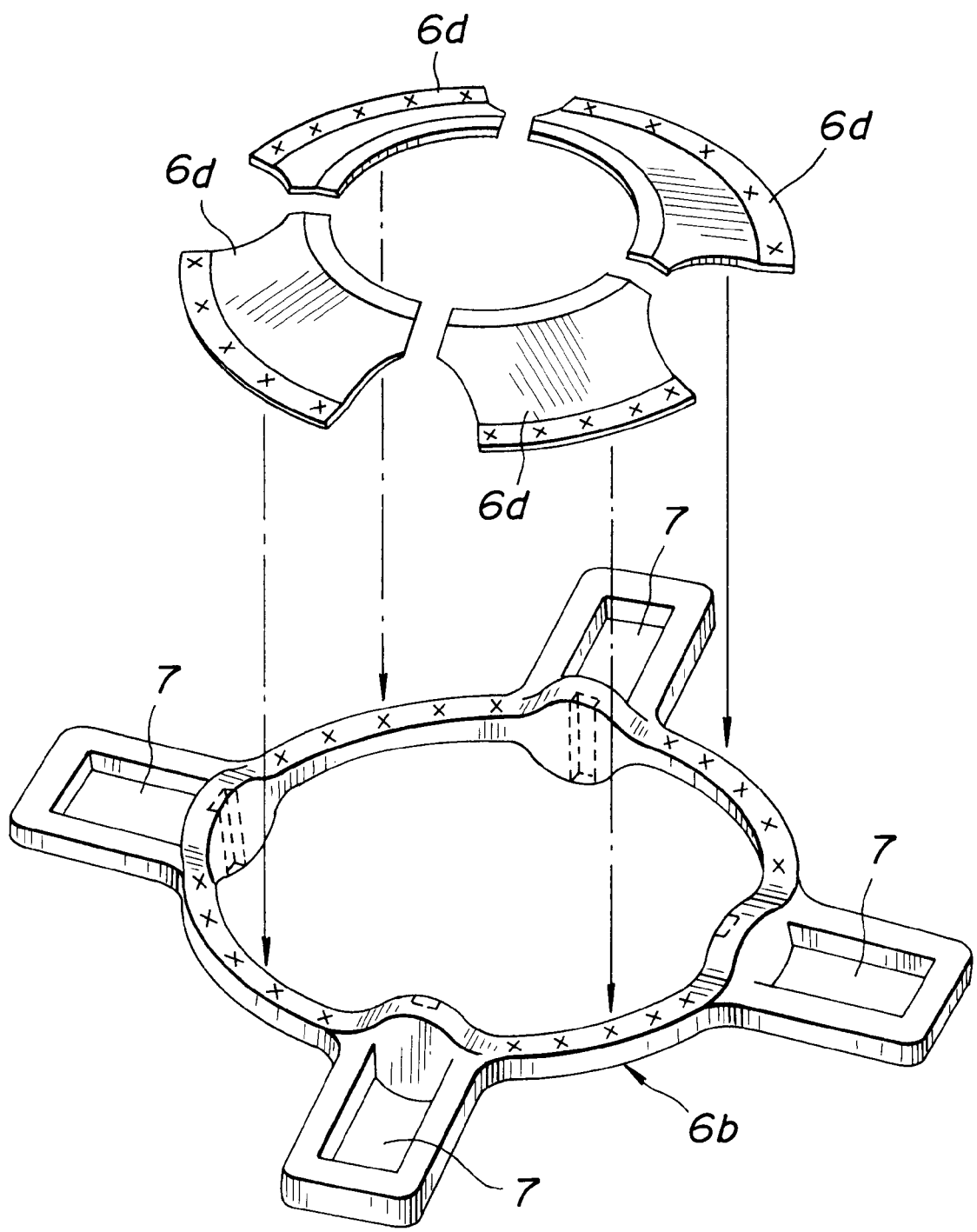
FIG. 4 is a view similar to FIG. 3, showing a third embodiment of the present invention.

FIG. 4 shows a third embodiment of the present invention wherein the cover 6d includes divisions, each being connected to the side surface of the holding member 6b. The third embodiment not only produces the same effect as that of the first embodiment as shown in FIG. 2, but ensures more effective lubrication of the cam rollers 6a due to formation of the grooves 8 in the same way as in the second embodiment as shown in FIG. 3.

Figure 5A:
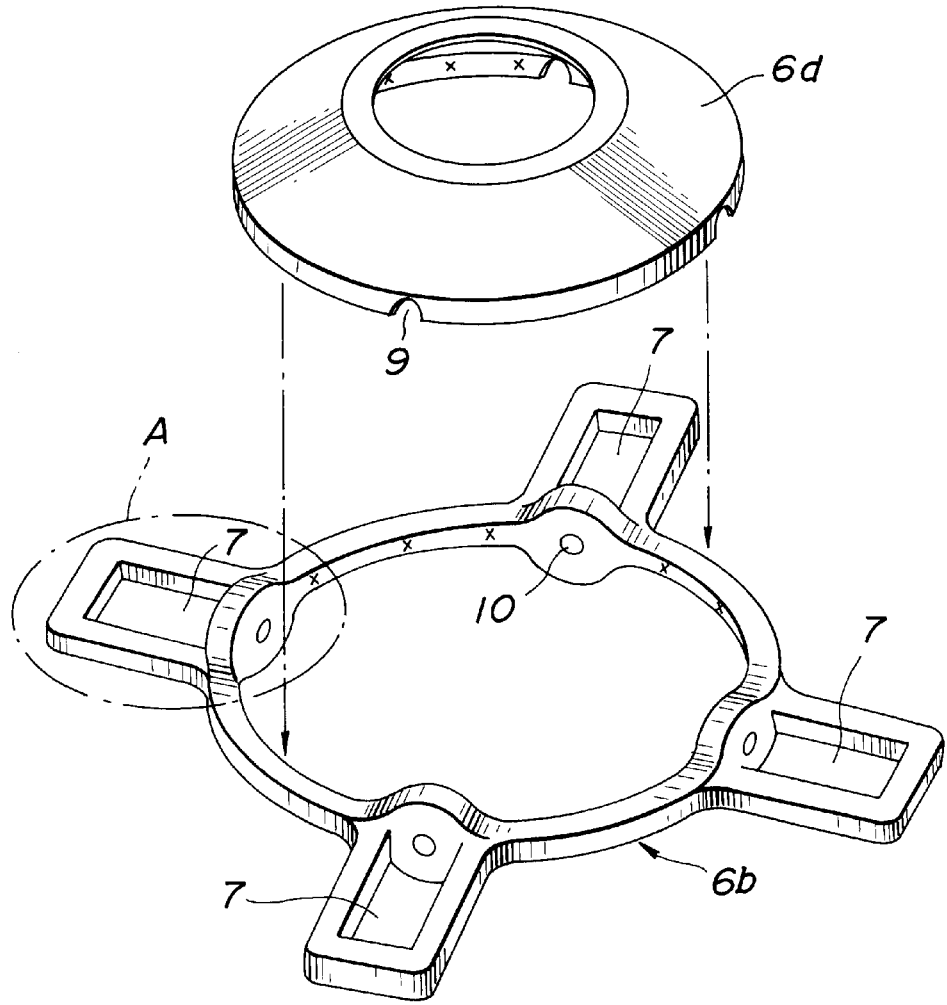
FIG. 5A is a view similar to FIG. 4, showing a fourth embodiment of the present invention.
Figure 5B:
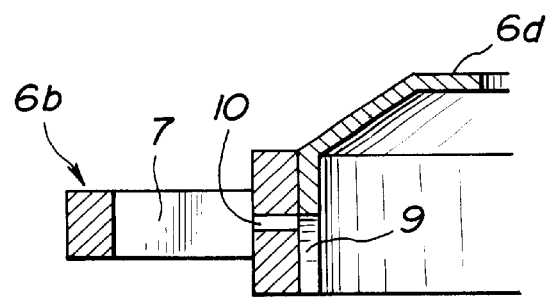
FIG. 5B is a sectional view of a portion A in FIG. 5A.

FIGS. 5A–5B show a fourth embodiment of the present invention wherein the cover 6d having an outer peripheral wall formed with recesses 9 is joined to the holding member 6b so that the recesses 9 correspond to oil holes 10 radially formed through the holding member 6b.

Figure 6A:
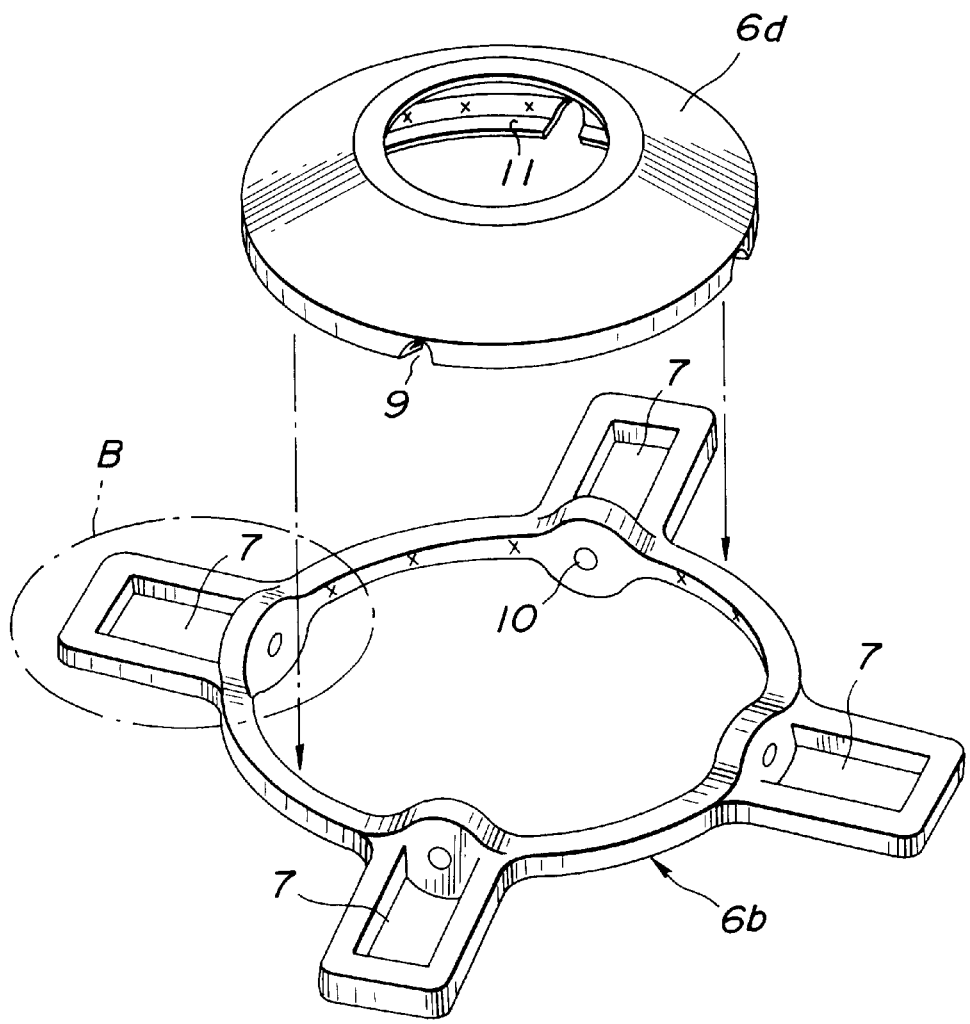
FIG. 6A is a view similar to FIG. 5A, showing a fifth embodiment of the present invention.
Figure 6B:
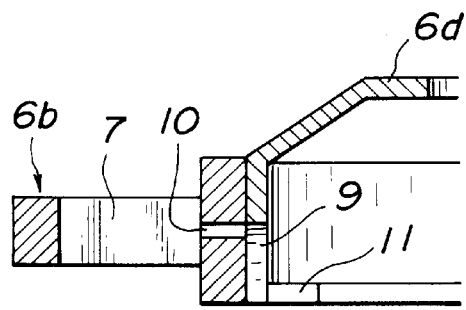
FIG. 6B is a view similar to FIG. 5B, showing a portion B in FIG. 6A.

FIGS. 6A–6B show a fifth embodiment of the present invention which is substantially the same as the fourth embodiment except that the cover 6d includes a fold connected to the end of the outer peripheral wall.

In the fourth and fifth embodiments, lubricating oil is supplied from the inside of the cover 6d to the cam rollers 6a through the oil holes 10. According to the fifth embodiment, particularly, the fold 11 of the cover 6d serves to hold a predetermined amount of lubricating oil in the cover 6d, having an advantage of enabling a reduction in supplied amount of lubricating oil.

In the above embodiments, the cover 6d is joined to the holding member 6b by beam or spot welding. Alternatively, the cover 6d may be integrated with the holding member 6b to remove the welding process. Moreover, when formed as described in the third embodiment to include divisions, the cover 6d has increased parts number, so that the cover 6d is preferably formed in a unit in view of a reduction in the parts number, welding points, and plate thickness.

What is claimed is:

1. A loading cam for a continuously variable transmission provided with input and output disks disposed to face each other with respect to a main shaft of the transmission, a power roller frictionally engaged with the input and output disks, and a cam flange disposed at the back of the input disk, the loading cam comprising:

cam rollers contacting the input disk and the cam flange, said cam rollers pressing the input disk in an axial direction of the main shaft upon shifting;

a holding member engaged with the cam flange, said holding member holding said cam rollers; and a cover attached to said holding member, said cover cooperating with said holding member to define a passage for supplying lubricating oil for said cam rollers.

2. A loading cam as claimed in claim 1, wherein said holding member is formed with channels which correspond to said cam rollers.

3. A loading cam as claimed in claim 2, wherein said channels include grooves formed in said axial direction of the main shaft.

4. A loading cam as claimed in claim 2, wherein said channels include holes radially formed through said holding member.

5. A loading cam as claimed in claim 1, wherein said cover is formed with recesses which correspond to said cam rollers.

6. A loading cam as claimed in claim 1, wherein said cover is integrated with said holding member.

7. In a continuously variable transmission:

input and output disks disposed to face each other with respect to a main shaft of the transmission;

a power roller frictionally engaged with said input and output disks;

a cam flange disposed at a back of said input disk; and a loading cam comprising:

cam rollers contacting said input disk and said cam flange, said cam rollers pressing said input disk in an axial direction of said main shaft upon shifting;

a holding member engaged with said cam flange, said holding member holding said cam rollers; and a cover attached to said holding member, said cover cooperating with said holding member to define a passage for supplying lubricating oil for said cam rollers.

8. In a continuously variable transmission as claimed in claim 7, wherein said holding member is formed with channels which correspond to said cam rollers.

9. In a continuously variable transmission as claimed in claim 8, wherein said channels include grooves formed in said axial direction of the main shaft.

10. In a continuously variable transmission as claimed in claim 8, wherein said channels include holes radially formed through said holding member.

11. In a continuously variable transmission as claimed in claim 7, wherein said cover is formed with recesses which correspond to said cam rollers.

12. In a continuously variable transmission as claimed in claim 7, wherein said cover is integrated with said holding member.

* * * * *

UNITED STATES PATENT AND TRADEMARK OFFICE
CERTIFICATE OF CORRECTION

PATENT NO. : 5,899,827
DATED : May 4, 1999
INVENTOR(S) : Masaki NAKANO.

It is certified that error appears in the above-identified patent and that said Letters Patent is hereby corrected as shown below:

Title page, item

--[73]   Assignee Name delete "MVTOR" and replace with - -MOTOR- -.

Signed and Sealed this

Tenth Day of April, 2001

Attest:

NICHOLAS P. GODICI

*Attesting Officer*   Acting Director of the United States Patent and Trademark Office